United States Patent
Nakagishi et al.

(10) Patent No.: US 6,930,719 B2
(45) Date of Patent: Aug. 16, 2005

(54) LENS UNIT STRUCTURE FOR SLR DIGITAL CAMERA

(75) Inventors: Toshio Nakagishi, Saitama-ken (JP); Isao Okuda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 897 days.

(21) Appl. No.: 09/771,580

(22) Filed: Jan. 30, 2001

(65) Prior Publication Data

US 2001/0010765 A1 Aug. 2, 2001

(30) Foreign Application Priority Data

Jan. 31, 2000 (JP) .......................................... 2000-21183

(51) Int. Cl.⁷ .............................................. H04N 5/225
(52) U.S. Cl. ....................... 348/335; 348/341; 348/360; 396/382
(58) Field of Search ................................. 348/373, 374, 348/335, 340, 341, 360, 344; 396/429, 373–383, 71, 83, 84, 111

(56) References Cited

U.S. PATENT DOCUMENTS

| | | | |
|---|---|---|---|
| 4,000,501 A | * | 12/1976 | Sakaguchi et al. ............. 396/83 |
| 4,948,227 A | | 8/1990 | Takeyasu |
| 5,444,485 A | * | 8/1995 | Uchioke et al. ............. 348/335 |
| 5,812,889 A | | 9/1998 | Nomura et al. |
| 5,822,626 A | * | 10/1998 | Kosako ....................... 396/84 |
| 5,937,215 A | | 8/1999 | Mogamiya |
| 6,147,810 A | * | 11/2000 | Misaka ....................... 359/684 |
| 6,157,781 A | * | 12/2000 | Konno et al. ................. 396/71 |
| 6,304,727 B1 | * | 10/2001 | Funahashi .................... 396/84 |
| 6,366,323 B1 | * | 4/2002 | Shono ........................ 348/340 |
| 6,643,459 B2 | * | 11/2003 | Ota ............................ 396/84 |
| 6,670,989 B2 | * | 12/2003 | Kawanishi et al. .... 348/240.99 |

* cited by examiner

*Primary Examiner*—Tuan Ho
*Assistant Examiner*—Yogesh Aggarwal
(74) *Attorney, Agent, or Firm*—Greenblum & Bernstein, P.L.C.

(57) ABSTRACT

A lens unit structure for an SLR digital camera is provided with a photographing lens block and a finder block. The photographing lens block includes a lens barrel having a pair of guide shafts extending in parallel with an optical axis. Ends of the guide shafts are secured to the lens barrel. A focusing lens and a zoom lens are slidably supported by the guide shaft so as to move in a direction of the optical axis, but prevents the lenses from moving in a direction perpendicular to the optical axis. The finder block includes a casing that accommodates a finder optical system, a CCD, and a beam splitter. The beam splitter splits the light from the photographing lens block into components directed to the finder optical system and the image capturing element. The casing has a plurality of holes respectively receiving the pair of guide shaft members.

10 Claims, 3 Drawing Sheets

LENS UNIT STRUCTURE FOR SLR DIGITAL CAMERA

BACKGROUND OF THE INVENTION

The present invention relates to a lens unit structure adopted for use in an SLR (single lens reflex) type digital camera.

Recently, SLR type digital cameras (hereinafter, referred to as SLR digital cameras) have become widely used. An example of an SLR digital camera is constructed as follows.

The light from an object is incident on a photographing lens system including a plurality of lens groups. The light passed through the photographing lens system is incident on a beam splitter, which splits the incident light into light directed toward a finder optical system, and light directed to an image capturing element such as a CCD (Charge Coupled Device). In particular, in the SLR digital camera which is not a lens-exchangeable one, the photographing lens system and the finder optical system as well as the beam splitter are integrally formed as a lens unit.

In general, the plurality of lens groups are held by respective frame members, which are mounted one by one with the optical axes thereof being made coincide with each other.

In order to assemble the frame members with holding the positional relationship therebetween, a plurality of bosses and corresponding holes for accepting the bosses are formed onto the opponent surfaces of the frame members.

In such a structure, however, position and surface errors of the bosses and holes may easily be accumulated, and the optical axes of the optical elements respectively held by the frame members may not be aligned accurately. Further, assembling of such a lens unit is an exacting work, which requires concentration and is time consuming.

SUMMARY OF THE INVENTION

It is therefore an object of the present invention to provide an improved lens unit structure for an SLR digital camera, with which the lens unit including the photographing optical system and the finder optical system can be assembled relatively easily at a high positioning accuracy.

For the above object, according to this invention, there is provided a lens unit structure for a single lens reflex digital camera, which is provided with a photographing lens block and a finder block. The photographing lens block includes a lens barrel having a plurality of guide shaft members extending in parallel with an optical axis of the photographing lens block, ends of the plurality of guide shafts being secured to the lens barrel, and at least one lens group accommodated in the lens barrel, the at least one lens group being slidably supported by the plurality of guide shaft members, the plurality of guide shaft members preventing the at least one lens group from moving in a direction perpendicular to the optical axis of the photographing lens block. The finder block includes a casing that accommodates a finder optical system, an image capturing element, and a beam splitter, an image receiving surface of the image capturing element being perpendicular to an optical axis of the beam splitter, the beam splitter splitting the light passed through the photographing lens block into light directed to the finder optical system and light directed to the image capturing element, the casing having a plurality of holes respectively receiving the plurality of guide shaft members provided to the lens barrel.

With this structure, the photographing lens block and the finder block can be separately assembled, and then both blocks are easily assembled at high accuracy.

It is preferable that, a positional relationship of an optical axis of the photographing lens block with respect to an optical axis of the finder block is regulated only by the plurality of guide shaft members.

According to another aspect of the invention, there is provided a lens unit structure for a single lens reflex digital camera, comprising an photographing lens block and a finder block. The photographing lens block includes a lens barrel having a first lens group and a plurality of guide shaft members extending in parallel with an optical axis of the first lens group, and at least one lens group accommodated in the lens barrel, the at least one lens group being supported by the plurality of guide shaft members, the at least one lens group being movable only in a direction parallel to the optical axis. Further, the finder block includes a casing that accommodates a finder optical system, an image capturing element, and a beam splitter, an image receiving surface of the image capturing element being perpendicular to an optical axis of the beam splitter, the beam splitter splitting the light passed through the photographing lens block into light directed to the finder optical system and light directed to the image capturing element, the casing having a plurality of holes respectively receiving the plurality of guide shaft members provided to the lens barrel.

With the above structure, the lens unit including the photographing optical system and the finder optical system can be assembled relatively easily at a high positioning accuracy.

Optionally, a position of the at least one lens group so that an optical axis of the at least one lens coincides with the optical axis of the first lens group may be regulated only by the plurality of guide shaft members.

In particular, an optical alignment of the photographing lens block and the finder block is regulated by inserting the plurality of guide shaft members in the plurality of holes, respectively.

Further optionally, the at least one lens group accommodated in the lens barrel includes a focusing lens.

In a particular case, the focusing lens may be held by a focusing lens frame, and a plurality of through holes, in which the plurality of guide shaft members are slidably inserted, are formed on the focusing lens frame.

Still optionally, at least one lens group accommodated in the lens barrel may further include a zoom lens.

In this case, the focusing lens may be held by a zoom lens frame, and a plurality of through holes, in which the plurality of guide shaft members are slidably inserted, are formed on the focusing lens frame.

In a particular case, the plurality of guide shaft members consists of a pair of shaft members.

In this case, the pair of shaft members may be arranged opposite to each other with respect to the optical axis of the first lens group.

Still optionally, the first lens group may be an objective lens group of the photographing lens.

DESCRIPTION OF THE ACCOMPANYING DRAWINGS

DESCRIPTION OF THE EMBODIMENT

Referring to the accompanying drawings, an SLR digital camera according to an embodiment of the invention will be described.

Figure 1:
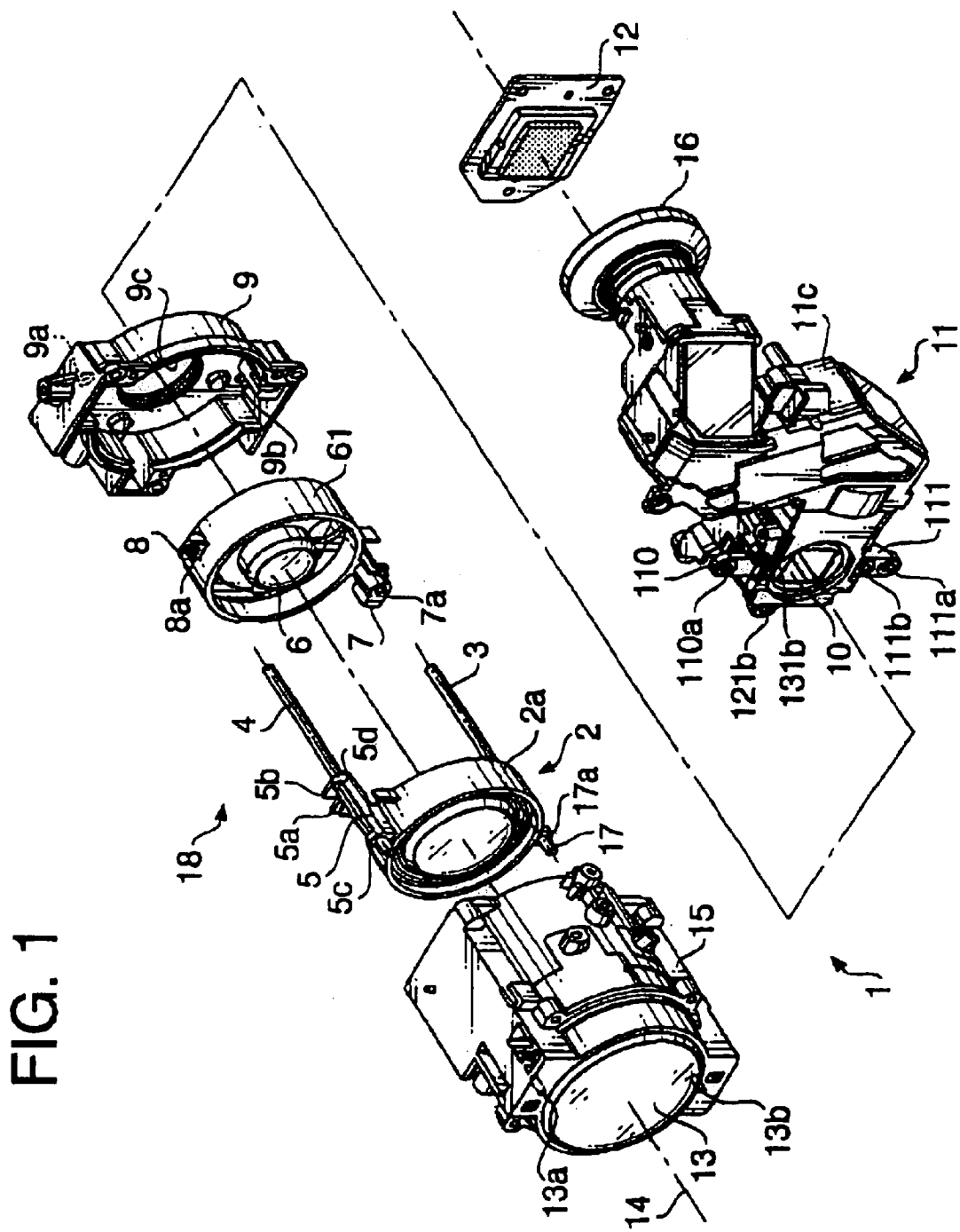
FIG. 1 is an exploded perspective view of a lens unit, which includes a photographing lens block and a finder block, for a single lens reflex camera according to an embodiment of the invention.

FIG. 1 is an exploded perspective view of a lens unit 1 for a single lens reflex camera according to an embodiment of the invention. As shown in FIG. 1, the lens unit 1 includes a photographing lens block 18 and a finder block 11. The photographing lens block 18 and the finder block 11 are separately assembled, and then both blocks 11 and 18 are assembled into the lens unit 1.

The photographing lens block 18 includes an objective lens 13 attached to a lens barrel 15, a focusing lens 2 and a zoom lens 6, which are movably supported inside the lens barrel 15.

The objective lens 13 receives the light from an object and converges the same. The light passed through the objective lens 13 further passes through, along an optical axis 14, the focusing lens 2 and the zoom lens 6, and is emerged from a window 9c formed on a lens barrel cover 9. Then, the light emerged from the window 9c is incident on a beam splitter 10, which is accommodated in the finder block 11.

Figure 2:
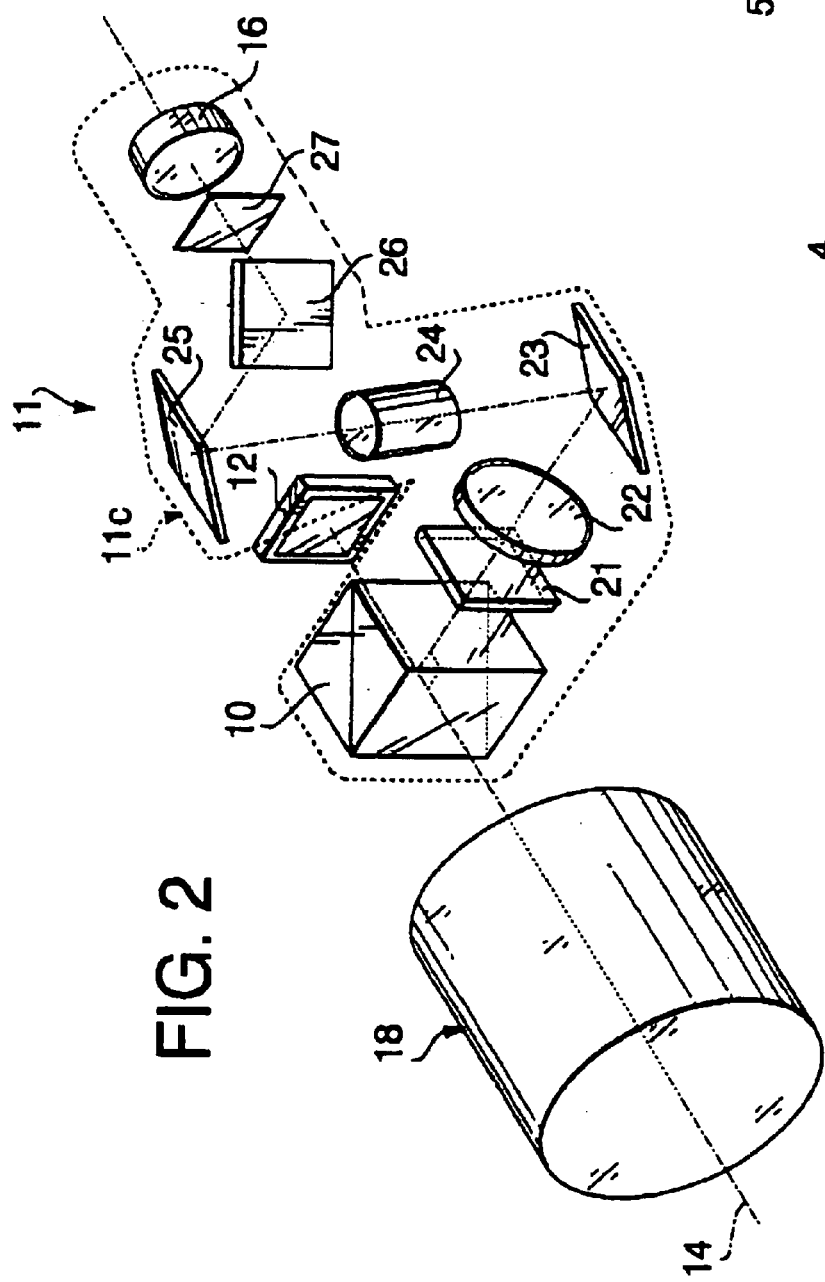
FIG. 2 shows an arrangement of optical elements of a finder optical system.

FIG. 2 shows an arrangement of optical elements accommodated in the finder block 11. The finder block 11 has a casing 11c which accommodates the above-mentioned beam splitter 10 which splits the incident light into two components: a first component directed to a finder optical system 20; and a second component directed to an imaging device 12.

As shown in FIG. 2, the first component split by the beam splitter 10 forms an image on a focusing glass 21. The light from the focusing glass 21 is collected by a collective lens 22, and is directed to a mirror 23. The light reflected by the mirror 23 passes through a relaying lens 24, reflected by mirrors 25 and 26, and forms an erected image on a second image plane 27. The erected image is viewed through an eyepiece lens 16 in a magnified fashion.

As shown in FIG. 1, the lens barrel 15 is formed with a pair of inner holes 13a and 13b oppositely arranged about and extended along the optical axis 14. In the inner holes 13a and 13b, one ends of a pair of guide shafts 3 and 4 are fitted, respectively.

The focusing lens 2 is held by a ring-shaped frame 2a (which will be referred to as a focusing lens frame). A coupling member 5, which is elongated in a direction parallel with the optical axis 14, is integrally formed on the outer circumferential surface of the focusing lens frame 2a.

Figure 3:
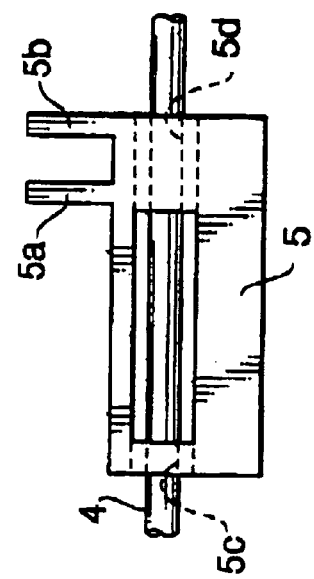
FIG. 3 is a plan view of a coupling member formed on a focusing lens frame.

FIG. 3 shows a plan view of the coupling member 5. The coupling member 5 is provided with a pair of guide holes 5c and 5d arranged to be spaced apart in the direction parallel to the optical axis 14. The guide shaft 4 is slidably fitted in guide holes 5c and 5d. It should be noted that the pair of guide holes 5c and 5d may be replaced with a through hole extending in a direction parallel to the optical axis 14.

The focusing lens frame 2a is further provided with a boss member 17 on the outer-circumferential surface thereof, at a position opposing to the coupling member 5 with respect to the optical axis 14. The boss member 17 is formed with a guide hole 17a, to which the guide shaft 3 is slidably inserted.

In order to allow manufacturing errors, the guide hole 17a may be formed as a rounded-rectangular shape, which is elongated along a line connecting the optical axis 14 and the center of the guide hole 17a. In this case, arc portions are located at both ends of the rectangular shape, a radius of curvature of each arc portion is substantially the same as the radius of the guide shaft 3, and a width (i.e., a distance between the longer sides) of the rectangular shape is substantially the same as the diameter of the guide shaft 3.

Further, the coupling member 5 is provided with a pair of lug members 5a and 5b (see FIG. 3), between which an operating member of a focusing lens driving mechanism (not shown) is engaged. By moving the operating member in a direction parallel to the optical axis 14, the focusing lens 2 is reciprocally moved along the optical axis 14 with guided by the guide shafts 3 and 4.

Since the guide shafts 3 and 4 are secured to the lens barrel 15, and the frame 2a is movable only in the direction of the optical axis 14, the positional relationship of the frame 2a with respect to the lens barrel 15 in a direction perpendicular to the optical axis of the lens barrel 15 is fixed. It should be noted that the holes 5c, 5d and 17a should be formed such that, when the focusing lens frame 2a is supported by the guide shafts 3 and 4, the optical axis of the focusing lens 2 coincides with the optical axis of the objective lens 13.

Similarly, the zoom lens 6 is held by a ring-shaped frame 61 (which will be referred to as zoom lens frame), which is formed with a coupling member 7 on the outer circumferential surface thereof. The coupling member 7 is formed with a through hole (guide hole) 7a, to which the guide shaft 3 is slidably inserted. It should be noted that the coupling member 7 is located on the guide shaft 3 side in order to avoid the conflict thereof with respect to the coupling member 5 when the focusing lens frame 2a and the zoom lens frame 61 approach.

The zoom lens frame 61 is further formed with a boss member 8 on the outer-circumferential surface thereof, at the position opposite to the coupling member 7 with respect to the optical axis of the zoom lens 6. A through hole (guide hole) 8a is formed on the boss member 8. The guide shaft 4 is slidably inserted in the guide hole 8a.

In order to allow manufacturing errors, the guide hole 8a may be formed as a rounded-rectangular shape, which is elongated along a line connecting the optical axis 14 and the center of the guide hole 8a. In this case, arc portions are located at both ends of the rectangular shape, a radius of curvature of each arc portion is substantially the same as the radius of the guide shaft 4, and a width (i.e., a distance between the longer sides) of the rectangular shape is substantially the same as the diameter of the guide shaft 4.

The coupling member 7 is engaged with an operating member of a zoom lens driving mechanism (not shown) so that the zoom lens frame 61 is reciprocally movable along the optical axis 14 with guided by the guide shafts 3 and 4.

Since the guide shafts 3 and 4 are secured to the lens barrel 15, and the frame 61 is movable only in the direction of the optical axis 14, the positional relationship of the frame 61 with respect to the lens barrel 15 in a direction perpendicular to the optical axis of the lens barrel 15 is fixed. It should be noted that the through holes 7a and 8a should be formed such that, when the frame 61 is supported by the guide shafts 3 and 4, the optical axis of the zoom lens 6 coincides with the optical axis of the objective lens 13.

The lens barrel cover 9 is provided with a pair of through-holes 9a and 9b, through which the guide shafts 4 and 3 are inserted.

The photographing lens block 18 is assembled as follows.

Firstly, the pair of guide shafts 3 and 4 are inserted through the guide hole 17a, and the pair of guide holes 5c and 5d of the focusing lens frame 2a, respectively. The ends of the guide shafts 3 and 4, which are protruded from the focusing lens frame 2a, are fitted into the inner holes 13a and 13b. Then, the focusing lens frame 2a is accommodated inside the lens barrel 15.

Thereafter, the zoom lens frame 61 is accommodated in the lens barrel 15 by inserting the guide shafts 3 and 4 through the guide holes 7a and 8a, respectively. Then, the guide shafts 3 and 4 inserted through the holes 9b and 9a of the lens barrel cover 9, respectively, and the lens barrel cover 9 is attached and secured to the lens barrel 15 by means of screws (not shown).

Figure 4:
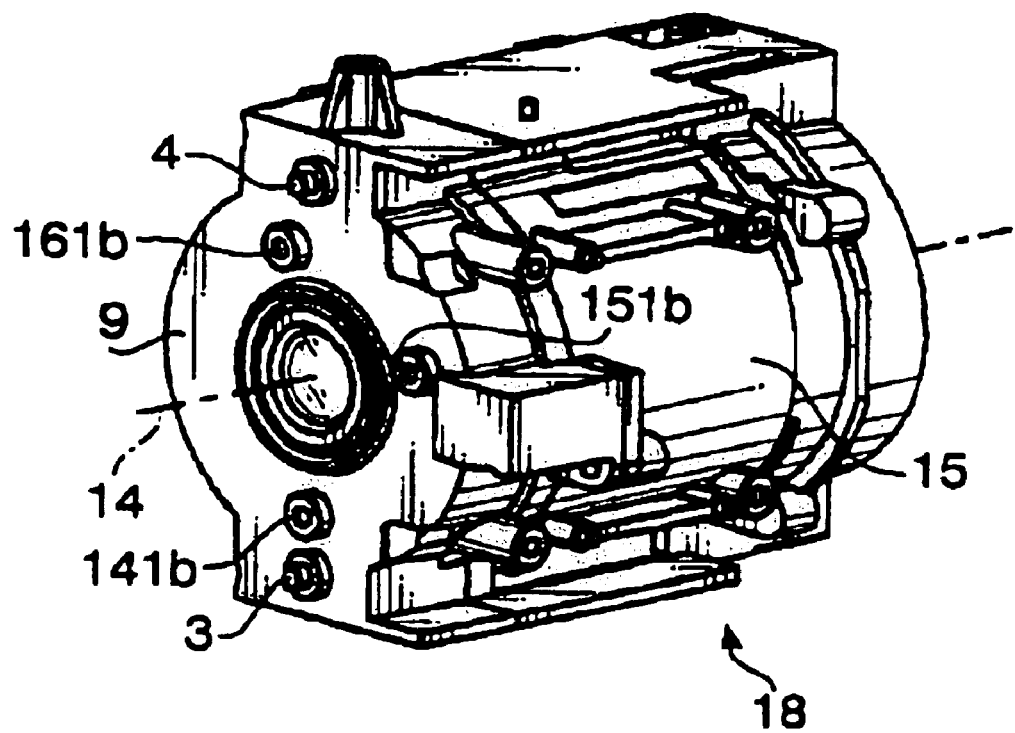
FIG. 4 is a perspective rear view of the photographing lens block.

FIG. 4 is a perspective rear view of the photographing lens block 18 as assembled. As shown in FIG. 4, when the lens barrel cover 9 has been attached to the lens barrel 15, the guide shafts 3 and 4 are slightly protruded from the lens barrel cover 9 through the holes 9b and 9a, respectively.

Since the positions of the lens barrel 15, the focusing lens frame 2a, the zoom lens frame 61 and the lens barrel cover 9 are regulated by the common guide shafts 3 and 4, which extend in the direction parallel to the optical axis 14, the photographing lens block 18 can be assembled at a high positional accuracy, and the objective lens 13, the focusing lens 2 and the zoom lens 6 can be precisely aligned to have the common optical axis 14.

Next, assembling of the photographing lens block 18 and the finder block 11 will be described.

The imaging device 12 is secured to the predetermined position of the finder block 11, on a rear side of the beam splitter 10 such that the image receiving surface of the imaging device 12 is perpendicular to the optical axis of the beam splitter 10 (see FIGS. 1 and 2), by screws or the like.

The finder block 11 is provided with a pair of protruding members 110 and 111, which are protruded in a direction perpendicular to the optical axis 14. The protruding members 110 and 111 respectively having through-holes 110a and 111a, which extend in a direction parallel to the optical axis 14, at the positions corresponding to the through-holes 9b and 9a of the lens barrel cover 9, or the positions corresponding to the guide shafts 4 and 3 protruded from the lens barrel cover 9, respectively.

When the finder block 11 is coupled to the photographing lens block 18, the guide shafts 4 and 3 protruded out of the photographing lens block 18 (see FIG. 4) are inserted through the through-holes 110a and 111a of the finder block 11. By inserting the guide shafts 4 and 3 through the through-holes 110a and 111a, the positional relationship between the finder block 11 and the photographing lens block 18 in the direction perpendicular to the optical axis 14 is fixed. Then, the finder block 11 is abutted against the photographing lens block 18 and secured to the lens barrel cover 9 thereof by means of screws (not shown) which are inserted in screw holes 111b, 121b, 131b (see FIG. 1) and 141b, 151b and 161b (see FIG. 4). Thereby, the finder block 11 is securely coupled to the photographing lens block 18.

As described above, according to the lens unit 1 described above, the pair of guide shafts 3 and 4 are used for adjusting the positional relationship of the focusing lens 2 and the zoom lens 6 with respect to the optical axis 14, and for guiding the reciprocal movements (i.e., focusing and zooming) of the focusing lens and the zoom lens. Further, the guide shafts 3 and 4 are used for adjusting the positional relationship, in the direction perpendicular to the optical axis 14, between the separately assembled photographing lens block 18 and the finder block 11.

In the above-described embodiments, the photographing lens block is described to include both the focusing lens and the zoom lens. The invention is not limited to this structure, and even if the photographing lens includes only one movable lens (i.e., focusing lens), the invention can be applied. Further, even in a case where the photographing lens includes more than two lenses which are to be guided by and movable along the guide shafts, the invention can be applied.

The present disclosure relates to the subject matter contained in Japanese Patent Application No. 2000-021183, filed on Jan. 31, 2000, which is expressly incorporated herein by reference in its entirety.

What is claimed is:

1. A lens unit structure for a single lens reflex digital camera, comprising a photographing lens block and a finder block, wherein said photographing lens block includes:
  a lens barrel having a plurality of guide shaft members extending in parallel with an optical axis of said photographing lens block, proximal ends of said plurality of guide shaft members being secured to said lens barrel and distal ends of said plurality of guide shaft members projecting out of said photographing lens block; and
  at least one lens group accommodated in said lens barrel, said at least one lens group being slidably supported in the direction of said optical axis by said plurality of guide shaft members, said plurality of guide shaft members preventing said at least one lens group from moving in a direction perpendicular to the optical axis of said photographing lens block;
wherein said photographing lens block comprises an integrally formed unit that is separable from said finder block; and
wherein said finder block includes a casing that accommodates a finder optical system, an image capturing element, and a beam splitter, an image receiving surface of said image capturing element being perpendicular to an optical axis of said beam splitter, said beam splitter splitting the light passed through said photographing lens block into light directed to said finder optical system and light directed to said image capturing element, said casing having a plurality of holes respectively receiving said distal ends of said plurality of guide shaft members provided on said lens barrel;
wherein said plurality of guide shaft members regulate a positional relationship of an optical axis of said photographing lens block with respect to an optical axis of said finder block.

2. A lens unit structure for a single lens reflex digital camera, comprising an photographing lens block and a finder block, wherein said photographing lens block includes:
  a lens barrel having a first lens group and a plurality of guide shaft members extending in parallel with an optical axis of said first lens group, distal ends of said plurality of guide shaft members projecting out of said photographing lens block; and
  at least one lens group accommodated in said lens barrel, said at least one lens group being supported by said plurality of guide shaft members, said at least one lens group being movable only in a direction parallel to said optical axis, wherein said photographing lens block comprises an integrally formed unit that is separable from said finder block;

wherein said finder block includes a casing that accommodates a finder optical system, an image capturing element, and a beam splitter, an image receiving surface of said image capturing element being perpendicular to an optical axis of said beam splitter, said beam splitter splitting the light passed through said photographing lens block into light directed to said finder optical system and light directed to said image capturing element, said casing having a plurality of holes respectively receiving said distal ends of said plurality of guide shaft members provided on said lens barrel;

wherein an optical alignment of said photographing lens block and said finder block are regulated by inserting said distal ends of said plurality of guide shaft members in said plurality of holes, respectively.

3. The lens unit structure according to claim 2, wherein said plurality of guide shaft members regulate a position of said at least one lens group so that an optical axis of said at least one lens group coincides with the optical axis of said first lens group.

4. The lens unit structure according to claim 2, wherein said at least one lens group accommodated in said lens barrel includes a focusing lens.

5. The lens unit structure according to claim 4, wherein said focusing lens being held by a focusing lens frame, a plurality of through holes in which said plurality of guide shaft members are slidably inserted are formed on said focusing lens frame.

6. The lens unit structure according to claim 4, wherein said at least one lens group accommodated in said lens barrel includes a zoom lens.

7. The lens unit structure according to claim 6, wherein said zoom lens being held by a zoom lens frame, a plurality of through holes in which said plurality of guide shaft members are slidably inserted are formed on said zoom lens frame.

8. The lens unit structure according to claim 2, wherein said plurality of guide shaft members consists of a pair of shaft members.

9. The lens unit structure according to claim 8, wherein said pair of shaft members are arranged opposite to each other with respect to the optical axis of said first lens group.

10. The lens unit structure according to claim 2, wherein said first lens group is an objective lens group.

* * * * *